US011800380B1

(12) United States Patent
Sung (10) Patent No.: US 11,800,380 B1
(45) Date of Patent: Oct. 24, 2023

(54) FLEXIBLE UPLINK WAVEFORM SELECTION

(71) Applicant: T-Mobile Innovations LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 90 days.

(21) Appl. No.: 17/353,139

(22) Filed: Jun. 21, 2021

(51) Int. Cl.
*H04W 24/02* (2009.01)
*H04W 16/10* (2009.01)
*H04W 72/0453* (2023.01)
*H04W 72/0446* (2023.01)
*H04W 72/1263* (2023.01)
*H04W 72/50* (2023.01)

(52) U.S. Cl.
CPC ........... *H04W 24/02* (2013.01); *H04W 16/10* (2013.01); *H04W 72/0446* (2013.01); *H04W 72/0453* (2013.01); *H04W 72/1263* (2013.01); *H04W 72/535* (2023.01)

(58) Field of Classification Search
CPC . H04W 24/02; H04W 16/10; H04W 72/0446; H04W 72/0453; H04W 72/1257; H04W 72/1263
See application file for complete search history.

(56) References Cited

U.S. PATENT DOCUMENTS

| | | | |
|---|---|---|---|
| 10,165,578 B1 * | 12/2018 | Zappaterra | H04J 11/0056 |
| 10,523,358 B1 * | 12/2019 | Park | H04B 7/0686 |
| 10,624,070 B2 * | 4/2020 | Akkarakaran | H04L 5/0094 |
| 2017/0055281 A1 * | 2/2017 | Islam | H04L 5/0053 |
| 2018/0035422 A1 * | 2/2018 | Wang | H04L 5/0053 |
| 2018/0139785 A1 * | 5/2018 | Zhang | H04W 72/0413 |
| 2018/0279292 A1 | 9/2018 | Luo et al. | |
| 2019/0313409 A1 * | 10/2019 | Tian | H04W 28/0231 |

FOREIGN PATENT DOCUMENTS

| | | |
|---|---|---|
| WO | 2018/229736 A1 | 12/2018 |
| WO | 2021/047973 A1 | 3/2021 |

* cited by examiner

*Primary Examiner* — Andre Tacdiran
*Assistant Examiner* — Christopher Nguyen
(74) *Attorney, Agent, or Firm* — Jones Robb, PLLC (57) ABSTRACT

Configuring adjacent wireless sectors to rotate between different uplink waveforms according to one or more predetermined schemes, such that an overlap is minimized of uplink signals between the adjacent wireless sectors. Cell edge wireless devices are configured to use different uplink waveforms according to the predetermined schemes and/or responsive to detecting changes in modulation or MIMO layer assignments.

11 Claims, 8 Drawing Sheets

FLEXIBLE UPLINK WAVEFORM SELECTION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-Wave) networks, as well as older legacy networks. The rollout of 5G in terms of services, subscriptions and availability of 5G-capable devices is outpacing that of 4G Long-Term Evolution (LTE). In addition, the momentum behind 5G is expected to continue to be strong in the coming years, with a forecast of 5G subscriptions reaching 3.5 billion in 2026.

The engine for driving 5G forward for fast growth and rapid adoption is its radio access technology, referred to as New Radio (NR). The flexibility and scalability of 5G NR makes it possible to introduce timely enhancements to address new use cases to help expand the 5G ecosystem and connect more and more devices to the network. One recent example is NR support for different types of uplink waveform signals, which typically use orthogonal frequency division multiplexing (OFDM). For example, the different types of uplink waveforms include cyclic prefix (CP-OFDM) and discrete Fourier transform (DFT-s-OFDM). CP-OFDM is well-suited for maximizing a performance of spectral efficiency, e.g. in bits/Hz/s. Further, due to the user of inverse fast-Fourier transform (IFFT), CP-OFDM has a low complexity. In general, the principle behind CP-PFDM is to divide the total bandwidth into NFFT carriers, so that channel equalization can often be reduced as a one-tap coefficient per carrier. Finally, a cyclic prefix (CP) is inserted. DFT-s-OFSM, on the other hand, adds an additional discrete Fourier transform (DFT), a precoding stage that can be inserted before the IFFT to limit a peak-to-average power ratio (PAPR).

There are pros and cons to using either of CP-OFDM and DFT-s-OFDM that are well known in the art. For example, CP-OFDM provides better throughput, but also causes power amplifier spikes at wireless devices transmitting uplink data, particularly for cell-edge wireless devices. Whereas, DFT-s-OFDM provides a smoother power response in uplink signals for cell-edge wireless devices, but does not provide the higher throughput of CP-OFDM. Notably, the current state of the art does not adequately leverage the ability in 5G to utilize these waveforms for uplink signals efficiently while minimizing uplink interference.

Overview

Exemplary embodiments described herein include systems, methods, and processing nodes for selecting between uplink waveforms. An exemplary method for selecting between uplink waveforms includes configuring a first plurality of wireless sectors deployed within a cell site to utilize different uplink waveforms according to a predetermined scheme. and configuring a second plurality of wireless sectors deployed within a neighboring cell site to utilize the different uplink waveforms according to the predetermined scheme, such that an overlap is minimized of uplink signals from wireless devices in opposite facing wireless sectors from among the first and second pluralities of wireless sectors.

These exemplary operations described herein may be performed by a processing node within a system, such as a telecommunication system. For example, an exemplary system for flexible selection of uplink waveforms includes at least a first access node configured to deploy a first plurality of wireless sectors, a second access node neighboring the first access node and configured to deploy a second plurality of wireless sectors, and a processing node communicably coupled to both first and second access nodes, the processing node configured to perform operations comprising configuring the first plurality of wireless sectors to utilize different uplink waveforms according to a predetermined scheme, and configuring the second plurality of wireless sectors to utilize the different uplink waveforms according to the predetermined scheme, such that an overlap is minimized of uplink signals from wireless devices in opposite facing wireless sectors from among the first and second pluralities of wireless sectors.

DETAILED DESCRIPTION

The following disclosure provides systems and methods for flexible frequency division multiplexing (FDM) of 5G NR uplink channel bandwidth to support the coexistence of CP-OFDM and DFT-s-OFDM waveforms in the same uplink slot. Various schemes are proposed for offsetting starting resource block (RB) positions for DFT-s-OFDM waveforms between adjacent sectors of a cell site. The schemes are designed to ensure that a channel frequency region allocated for DFT-S-OFDM in a first sector (e.g. deployed in a first cell site) will likely be allocated for CP-OFDM in an opposite-facing sector (e.g. deployed in a second neighboring cell site), thus minimizing interference between uplink signals in opposite-facing sectors. For example, different offsets are selected for each of a plurality of adjacent sectors deployed by different antennae of a first access node, and similar different offsets are selected for a plurality of adjacent sectors deployed by different antennae of a second (neighboring) access node. Further, in another scheme, RBs are configured with the same offset but in a different direction. Further, different triggers are provided to transition between CP-OFDM and DFT-s-OFDM waveforms within a cell site or sectors deployed therein, such as uplink modulation changes, and changes to uplink multiple-input-multiple-output (MIMO) layer assignments. Wireless devices at opposite-facing cell-edges of each sector can benefit most from these methods, since they can simultaneously the DFT-s-OFDM waveform that is configured in different resource blocks, according to the example schemes described herein. Thus, an uplink link budget is improved at the cell edge of each sector, and since most of the link budget is limited by uplink, the overall cell coverage can be improved.

Therefore, a method as described herein includes configuring a first plurality of wireless sectors deployed within a cell site to utilize different uplink waveforms according to a predetermined scheme, and configuring a second plurality of wireless sectors deployed within a neighboring cell site to utilize the different uplink waveforms according to the predetermined scheme, such that an overlap is minimized of uplink signals from wireless devices in opposite facing wireless sectors from among the first and second pluralities of wireless sectors. Utilizing different uplink waveforms comprises scheduling the same portions of resource blocks within an uplink time slot of each adjacent sector to utilize different uplink waveforms. For the purposes of this disclosure "adjacent sectors" comprise a plurality of sectors deployed by antennae of a single access node, and "opposite-facing sectors" or "neighboring sectors" comprise two or more sectors deployed by different access nodes that may overlap in coverage area. Thus, in an example embodiment, a predetermined scheme comprises rotating usage of DFT-s-OFDM waveform in resource blocks of each adjacent sector, such that cell-edge wireless devices in opposite-facing sectors can simultaneously utilize the DFT-s-OFDM waveform and enhance user experience. In an example embodiment, the predetermined scheme comprises configuring each adjacent sector in a cell site to utilize a different starting offset for resource blocks using the first uplink waveform. Determining the starting offset can be based on a proportion of resource blocks utilizing the first uplink waveform relative to a total resource blocks available in the each sector. In another example embodiment, the predetermined scheme is reversed between first and second wireless sectors. The offset may be the same or different, but the direction of assigning resource blocks to the different waveforms is reversed. Further, switching the rotation or selection of uplink waveforms in each sector (or plurality of adjacent sectors) can be performed responsive to one or more of a change in uplink modulation or a change in a multiple-input multiple-output (MIMO) layer assignment. For example, the change in uplink modulation or MIMO layer assignment can indicate whether or not wireless devices within a sector are at or near a cell edge. Therefore, the resource block assignment for these sectors is dynamically selected to ensure that uplink signals therefrom do not interfere with each other and, in particular, the resource block assignments for cell-edge wireless devices that benefit from using the DFT-s-OFDM waveform.

These exemplary operations described herein may be performed by a processing node within a system, such as a telecommunication system. For example, an exemplary system for allocating resources in a wireless network includes at least a first access node configured to deploy a first plurality of wireless sectors, a second access node neighboring the first access node and configured to deploy a second plurality of wireless sectors, and a processing node communicably coupled to both first and second access nodes. The processing node can be configured to perform operations including configuring the each of the first plurality of wireless sectors to rotate between a first uplink waveform and a second uplink waveform according to a predetermined scheme, and configuring each of the second plurality of wireless sectors to rotate between the first uplink waveform and the second uplink waveform according to the predetermined scheme, such that an overlap is minimized of uplink signals between adjacent sectors from among the first and second pluralities of wireless sectors. Since opposite facing wireless sectors from among the first and second pluralities of wireless sectors would likely be using different resource blocks according to the predetermined scheme, uplink signals from cell-edge wireless devices in the opposite-facing sectors are less likely to interfere with each other. The predetermined scheme can include a starting offset for scheduling the first uplink waveform, wherein the starting offset is different for adjacent sectors within each of the first and second pluralities of wireless sectors. The operations can further comprise determining the starting offset based on a proportion of resource blocks utilizing each uplink waveform relative to a total resource blocks available in each sector. In an example embodiment, the predetermined scheme is reversed between the first and second pluralities of wireless sectors, whether the offset is the same or different, which can further reduce the odds of interference occurring between uplink signals in opposite-facing sectors.

These and other embodiments are further described herein and with reference to FIGS. 1-8.

Figure 1:
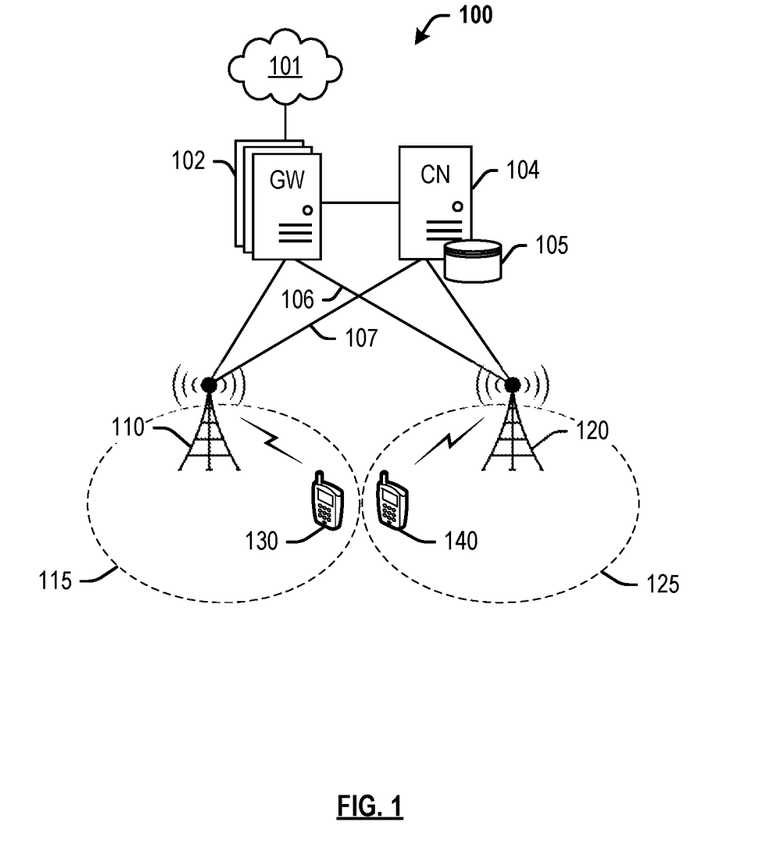
FIG. 1 depicts an exemplary system for flexible selection of uplink waveforms.

FIG. 1 depicts a system 100 comprising a communication network 101, gateway 102, controller node 104, access nodes 110, 120, and wireless devices 130, 140. In this exemplary embodiment, access nodes 110, 120 may be macrocell access nodes configured to deploy one or more wireless air interfaces to which wireless devices 130, 140 can respectively attach and access network services from network 101. For example, access nodes 110, 120 can include an eNodeB, or a gNodeB, and is configured to deploy a wireless air interface one or more radio access technologies (RATs) such as 4G LTE and/or 5G NR. Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access nodes 110, 120 can be configured to communicate using both RATs at the same time. For example, dual connections can be set up with wireless device 130 using both 4G and 5G wireless air interfaces, with the 4G wireless air interface being used to transmit control information, and the 5G wireless air interface being used to transmit data information. Although only access nodes 110, 120 and wireless devices 130, 140 are illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, system 100 is further configured to perform operations for resource allocation including configuring wireless sectors deployed from each of access nodes 110 and 120 to rotate between a first uplink waveform and a second uplink waveform according to a predetermined scheme, such that an overlap is minimized of uplink signals between opposite-facing wireless sectors. The predetermined scheme can include a starting offset for scheduling the first uplink waveform, wherein the starting offset is different for each adjacent sector in a cell site 115, 125. The operations can further comprise determining the starting offset based on a proportion of resource blocks utilizing the first uplink waveform relative to a total resource blocks available in each sector. In an example embodiment, the predetermined scheme is reversed between the first and second pluralities of wireless sectors, whether the offset is the same or different. These examples are further described below with reference to FIGS. 5-6.

Access nodes 110, 120 can be any network node configured to provide communication between wireless devices 130, 140 and communication network 101, including standard access nodes such as a macro-cell access node, base transceiver station, a radio base station, an eNodeB device, an enhanced eNodeB device, an a next generation NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access nodes 110, 120 may comprise any short range, low power, small-cell access node such as a microcell access node, a picocell access node, a femtocell access node, or a home eNodeB/gNodeB device.

Access nodes 110, 120 can each comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication link 106. Access nodes 110, 120 may communicate with each other, and with other access nodes (not shown), using a wireless link or a wired link such as an X2 link. Components of exemplary access nodes 110, 120 are further described with reference to FIG. 2.

Wireless devices 130, 140 may be any device, system, combination of devices, or other such communication platform capable of communicating wirelessly with access nodes 110, 120 using one or more frequency bands deployed therefrom. Wireless devices 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna information/capabilities of wireless device 130, trends of usage over time, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, gateway(s) 102, controller node 104, and/or network 101.

Figure 2:
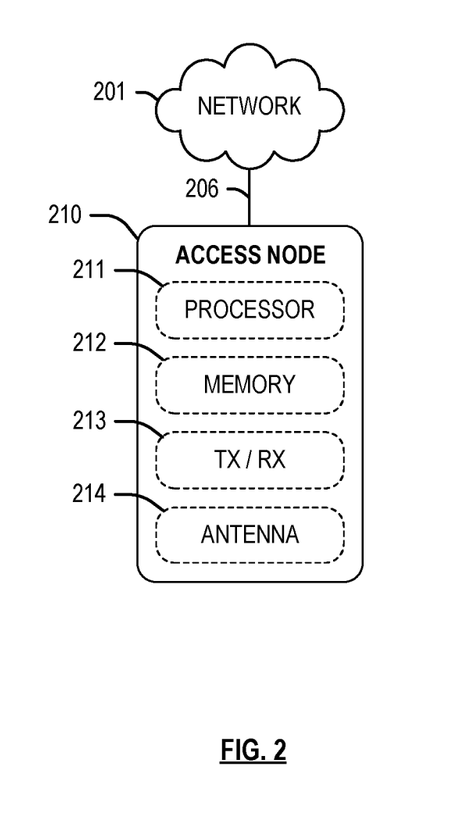
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, a transceiver 213, and antennae 214 (hereinafter referred to as antenna elements 214). Processor 211 executes instructions stored on memory 212, and transceiver 213 (in conjunction with antenna elements 214) enable wireless communication respectively at least two wireless air interfaces, such as 4G LTE and 5G NR. For example, access node 210 may be configured to transmit control information using a first set of antennae elements 214 configured to utilize a 4G LTE interface, and data information using a second set of antennae elements 214 configured to utilize a 5G NR air interface. Alternatively or in addition, each separate air interface maintains its own control and data transmissions. Further, antenna elements 214 may include an array of antenna elements that are configured to deploy air interfaces over one or more wireless sectors, form beams within these sectors, employ multiple-input-multiple-output (MIMO), etc.

In an exemplary embodiment, memory 212 can store instructions for configuring a first plurality of wireless sectors deployed by antennae 214 to utilize different uplink waveforms according to a predetermined scheme. Meanwhile a second plurality of wireless sectors deployed within a neighboring cell site (not shown herein) can also be configured to utilize the different uplink waveforms according to the predetermined scheme. Since opposite-facing sectors of each access node (e.g. access node 210 and a neighboring access node) would use different uplink waveforms according to the predetermined scheme, an overlap is minimized of uplink signals from wireless devices in opposite facing wireless sectors from among the first and second pluralities of wireless sectors. Utilizing different uplink waveforms comprises scheduling the same portions of resource blocks within an uplink time slot of each adjacent sector to utilize different uplink waveforms. For the purposes of this disclosure "adjacent sectors" comprise a plurality of sectors deployed by antennae 214 of a single access node 210, and "opposite-facing sectors" or "neighboring sectors" comprise two or more sectors deployed by different access nodes that may overlap in coverage area, as further shown herein with respect to FIGS. 5-6. Thus, in an example embodiment, a predetermined scheme comprises rotating usage of DFT-s-OFDM waveform in resource blocks of each adjacent sector, such that cell-edge wireless devices in opposite-facing sectors can simultaneously utilize the DFT-s-OFDM waveform and enhance user experience. In an example embodiment, the predetermined scheme comprises configuring each adjacent sector in a cell site to utilize a different starting offset for resource blocks using the first uplink waveform. Determining the starting offset can be based on a proportion of resource blocks utilizing the first uplink waveform relative to a total resource blocks available in the each sector. In another example embodiment, the predetermined scheme is reversed between first and second wireless sectors. The offset may be the same or different, but the direction of assigning resource blocks to the different waveforms is reversed. Further, switching the rotation or selection of uplink waveforms in each sector (or plurality of adjacent sectors) can be performed responsive to one or more of a change in uplink modulation or a change in a multiple-input multiple-output (MIMO) layer assignment. For example, the change in uplink modulation or MIMO layer assignment can indicate whether or not wireless devices within a sector are at or near a cell edge. Therefore, the resource block assignment for these sectors is dynamically selected to ensure that uplink signals therefrom do not interfere with each other and, in particular, the resource block assignments for cell-edge wireless devices that benefit from using the DFT-s-OFDM waveform.

Figure 3:
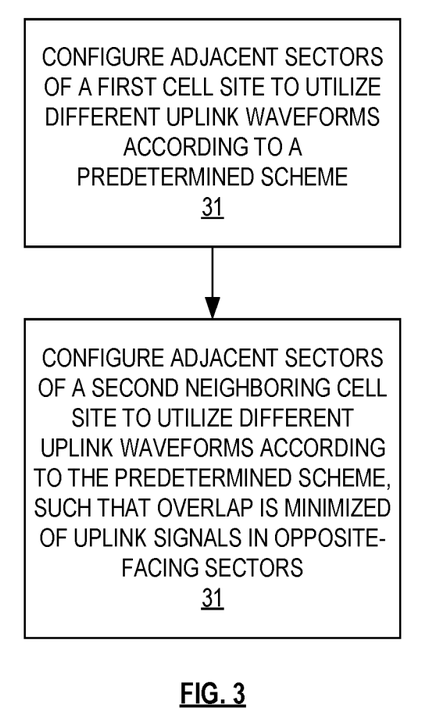
FIG. 3 depicts an exemplary method for flexible selection of uplink waveforms.

FIG. 3 depicts an exemplary method for uplink waveform selection. The method of FIG. 3 may be implemented by a processing node communicatively coupled to one or more access nodes, controller nodes, or any other network node.

Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 31, adjacent wireless sectors deployed within a cell site are instructed or configured to utilize different uplink waveforms according to a predetermined scheme. Further, at 32, adjacent wireless sectors deployed within a nearby neighboring cell site are instructed or configured to utilize different uplink waveforms according to the predetermined scheme The predetermined scheme can ensure that a channel frequency region allocated for DFT-S-OFDM in a first sector from among the adjacent wireless sectors will likely be allocated for CP-OFDM in an opposite-facing sector (e.g. deployed in a second neighboring cell site), thus minimizing interference between uplink signals in opposite-facing sectors. For example, different offsets are selected for each of a plurality of adjacent sectors deployed by different antennae of a first access node, and similar different offsets are selected for a plurality of adjacent sectors deployed by different antennae of a second (neighboring) access node. Utilizing different uplink waveforms comprises scheduling the same portions of resource blocks within an uplink time slot of each adjacent sector to utilize different uplink waveforms. For the purposes of this disclosure "adjacent sectors" comprise a plurality of sectors deployed by antennae of a single access node, and "opposite-facing sectors" or "neighboring sectors" comprise two or more sectors deployed by different access nodes that may overlap in coverage area. Thus, in an example embodiment, a predetermined scheme comprises rotating usage of DFT-s-OFDM waveform in resource blocks of each adjacent sector, such that cell-edge wireless devices in opposite-facing sectors can simultaneously utilize the DFT-s-OFDM waveform and enhance user experience. In an example embodiment, the predetermined scheme comprises configuring each adjacent sector in a cell site to utilize a different starting offset for resource blocks using the first uplink waveform. Determining the starting offset can be based on a proportion of resource blocks utilizing the first uplink waveform relative to a total resource blocks available in the each sector. In another example embodiment, the predetermined scheme is reversed between first and second wireless sectors. The offset may be the same or different, but the direction of assigning resource blocks to the different waveforms is reversed. Further, switching the rotation or selection of uplink waveforms in each sector (or plurality of adjacent sectors) can be performed responsive to one or more of a change in uplink modulation or a change in a multiple-input multiple-output (MIMO) layer assignment. For example, the change in uplink modulation or MIMO layer assignment can indicate whether or not wireless devices within a sector are at or near a cell edge. Therefore, the resource block assignment for these sectors is dynamically selected to ensure that uplink signals therefrom do not interfere with each other and, in particular, the resource block assignments for cell-edge wireless devices that benefit from using the DFT-s-OFDM waveform.

Figure 4:
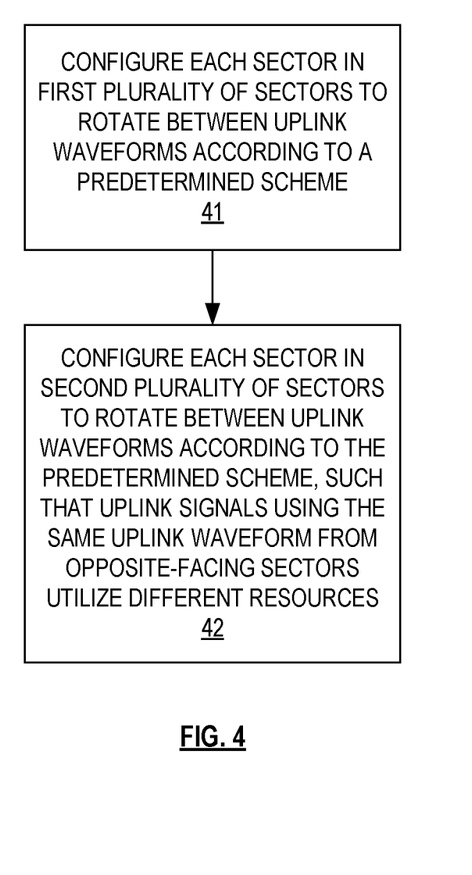
FIG. 4 depicts another exemplary method for flexible selection of uplink waveforms.

FIG. 4 depicts another exemplary method for resource allocation. The method of FIG. 4 may be implemented by a processing node communicatively coupled to one or more access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 41, a first plurality of adjacent sectors is configured to switch between DFT-s-OFDM and CP-OFDM uplink waveforms according to a predetermined scheme, and at 42, a second plurality of adjacent sectors neighboring the first sector is configured to switch between DFT-s-OFDM and CP-OFDM uplink waveforms according to the predetermined scheme, such that an overlap of resource blocks utilizing the same uplink waveform is minimized between the first and second cell sites. This is enabled by each cell site or access node deploying each respective plurality of sectors to follow the same predetermined scheme such that opposite facing sectors of each cell site are instructed to utilize different uplink waveforms. Further, the selection of waveforms can be based on predetermined schemes or may be triggered by one or more events. For example, starting RB positions for DFT-s-OFDM waveforms may be offset differently between adjacent sectors of cell sites, such that a channel frequency region allocated for DFT-S-OFDM in a first sector will likely be allocated for CP-OFDM in a neighboring or opposite-facing sector, thus minimizing interference between uplink signals in each sector. Different offsets are selected for each adjacent sectors or, in further example embodiments, RBs are configured with the same offset but in a different direction. Further, different triggers are provided to transition between CP-OFDM and DFT-s-OFDM waveforms, such as uplink modulation changes, and changes to uplink MIMO layer assignments. Wireless devices at cell-edges of each sector can benefit most from these methods.

Figure 5A:
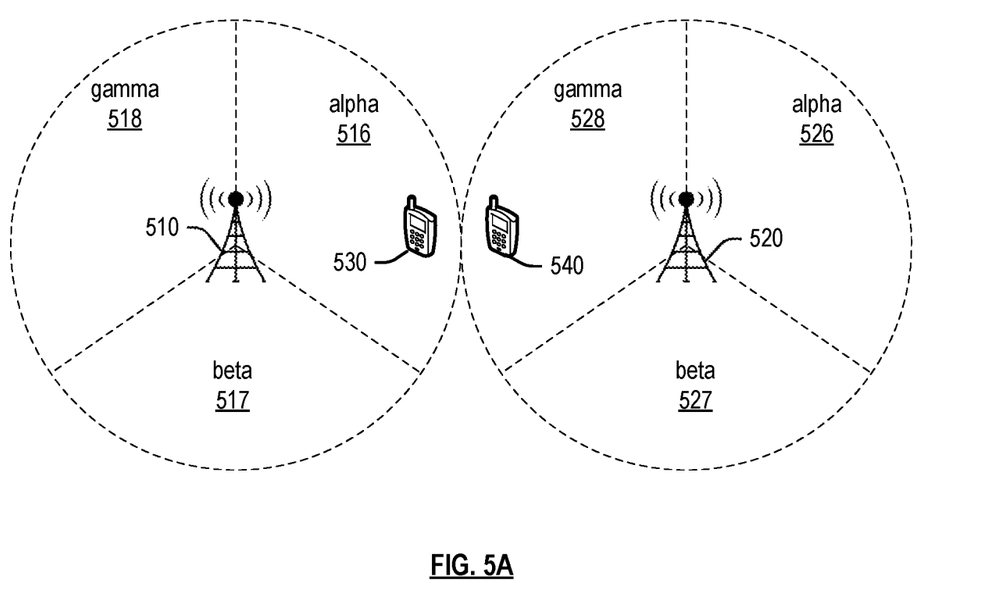
FIGS. 5A-5B depict an exemplary scheme for flexible selection of uplink waveforms.
Figure 5B:
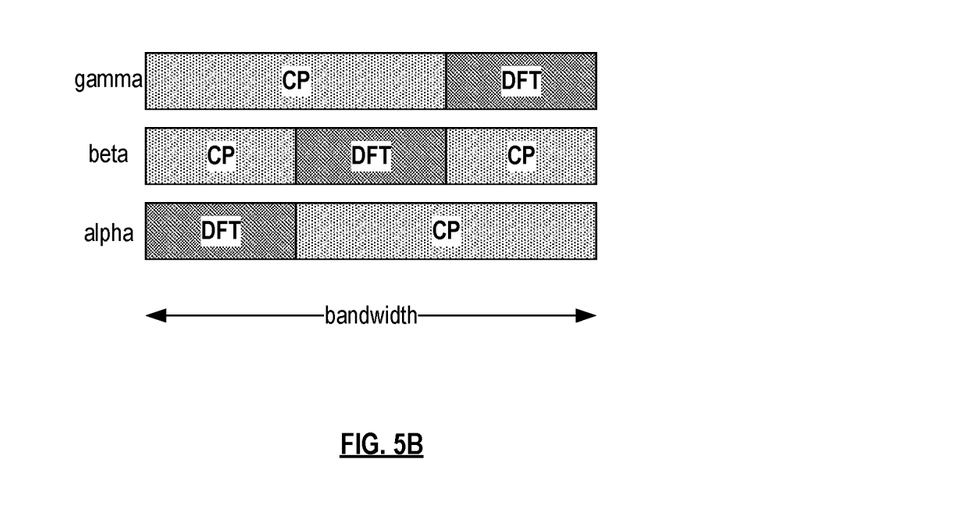

FIGS. 5A-5B depict an exemplary scheme for flexible selection of uplink waveforms. With reference to FIG. 5A, two access nodes 510 and 520 and wireless devices 530 and 540 are illustrated. These components can be considered similar to those illustrated in system 100, with the exclusion of other components not essential to the description of this embodiment while understood as being known to those having ordinary skill in the art in light of this disclosure such as a communication network, gateway, controller node, etc. In this exemplary embodiment, each access nodes 510, 520 can be configured to deploy at least three sectors, referred to herein as "alpha", "beta", and "gamma," by virtue of various antenna elements that are focused in arrays to deploy these sectors. For example, access node 510 is configured to deploy sectors alpha 516, beta 517, and gamma 518, while access node 520 is configured to deploy sectors alpha 526, beta 527, and gamma 528. Further, the orientation of sectors deployed by each access node 510, 520 is the same, such that sector alpha 516 is directly adjacent (or opposite facing) to sector gamma 528. Those of ordinary skill in the art would understand that if the relative positions of access nodes 510, 520 would be different, their respective opposite-facing sectors would still be different, i.e. sector beta 517 would face one or more of sectors gamma 528 and alpha 526, and vice versa.

Further, wireless devices 530 and 540 are illustrated as being respectively attached to opposite-facing sectors alpha 516 and gamma 528, and in particular, located at the cell edges thereof and adjacent the opposite facing cell. In an exemplary embodiment, a processing node communicatively coupled to one or both of access nodes 510, 520 is configured to switch between or rotate the usage of uplink waveforms for each set (or plurality) of sectors according to one or more predetermined schemes, such that an interference is minimized between uplink signals transmitted from each wireless device 530, 540. For example, wireless devices 530, 540, being at the cell edge of their respective sector, are instructed to utilize uplink slot with resource block allocated to different schemes or combinations of waveforms. The different schemes can include a different amount of starting offset for a specific type of waveform, e.g. a DFT-s-OFDM waveform.

See, for example, FIG. 5B, illustrating a predetermined scheme for switching or rotating of uplink waveforms in resource blocks assigned to each sector alpha, beta, and gamma, deployed by each access node 510, 520. In this example embodiment depicting a section of bandwidth assigned to each sector, sectors alpha (e.g. sectors 516, 526 deployed both access nodes 510, 520) are assigned DFT-s-OFDM waveform resource blocks without any offset (i.e. at the beginning of the assigned bandwidth), and sectors beta and gamma (e.g. beta sectors 517, 527 and gamma sectors 518, 528) are respectively assigned smaller and larger offsets. During the offsets assigned to sectors beta and gamma, CP-OFDM waveform resource blocks are assigned. As illustrated herein, CP-OFDM waveform resource blocks are assigned in a significant portion of the bandwidth in which DFT-s-OFDM waveform resource blocks are not assigned. Further, in this example, the same scheme (e.g. sequence of DFT-s-OFDM and CP-OFDM waveform resource blocks) is used by each access node 510, 520. By virtue of differently-labeled sectors facing each other, there is little to no overlap of DFT-s-OFDM waveform resource blocks between opposite-facing sectors. Thus, the predetermined scheme of FIG. 5B utilizes different starting offsets for resource block assignments for different sectors to minimize overlap of resource blocks, and therefore, interference between uplink signals utilizing said resource blocks.

Figure 6A:
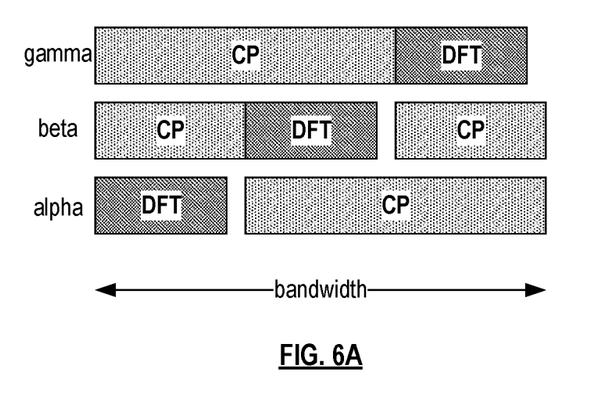
FIGS. 6A-6C depict additional exemplary schemes for flexible selection of uplink waveforms.
Figure 6B:
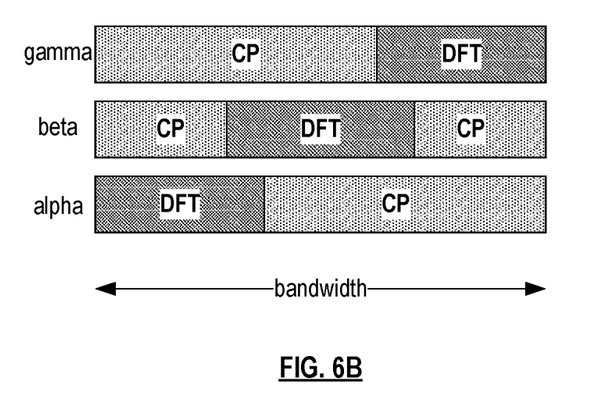
Figure 6C:
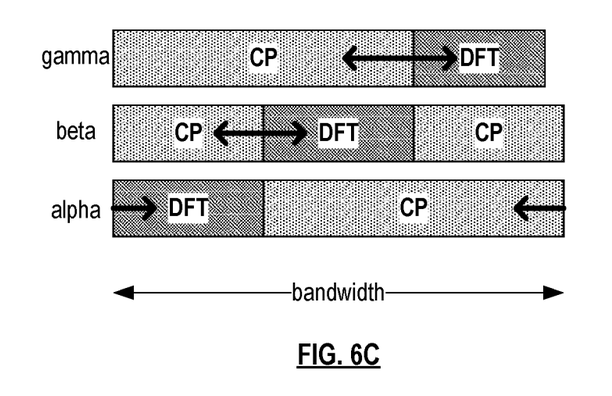

FIGS. 6A-6C depict additional exemplary schemes for flexible selection of uplink waveforms. As claimed below, the operations can further comprise determining the starting offset based on a proportion of resource blocks utilizing the first uplink waveform relative to a total resource blocks available in each sector. Thus, with reference to FIG. 6A, if the total number of resource blocks scheduled for DFT-s-OFDM (i.e. DFT-s-OFDM resource blocks) in a slot or bandwidth is less than a bandwidth floor (i.e. total RB size divided by a number of sectors in a site), then the offset to starting the DFT-s-OFDM resource blocks is adjusted as illustrated herein. For example, the offset to starting DFT-s-OFDM resource blocks for alpha is zero, for beta is ⅓, and for gamma is ⅔ (with 3/3=one slot). Alternatively, with reference to FIG. 6B, if the total number of DFT-s-OFDM RBs in a slot is greater than the floor (i.e. total RB size divided by number of sectors in a site), then the offset to starting the DFT-s-OFDM resource blocks is adjusted as illustrated herein. Finally, with reference to FIG. 6C, the predetermined scheme is reversed between the adjacent wireless sectors. For example, the starting offset may be the same, but RB allocation associated with the first waveform (e.g. DFT-s-OFDM) is in a different direction than the RB allocation associated with the second waveform (e.g. CP-OFDM). This ensures that neighboring cell sites using a similar scheme would configure an opposite-facing sector to utilize a different uplink waveform than an opposite-facing sector of the first plurality of adjacent sectors at any given time.

Figure 7:
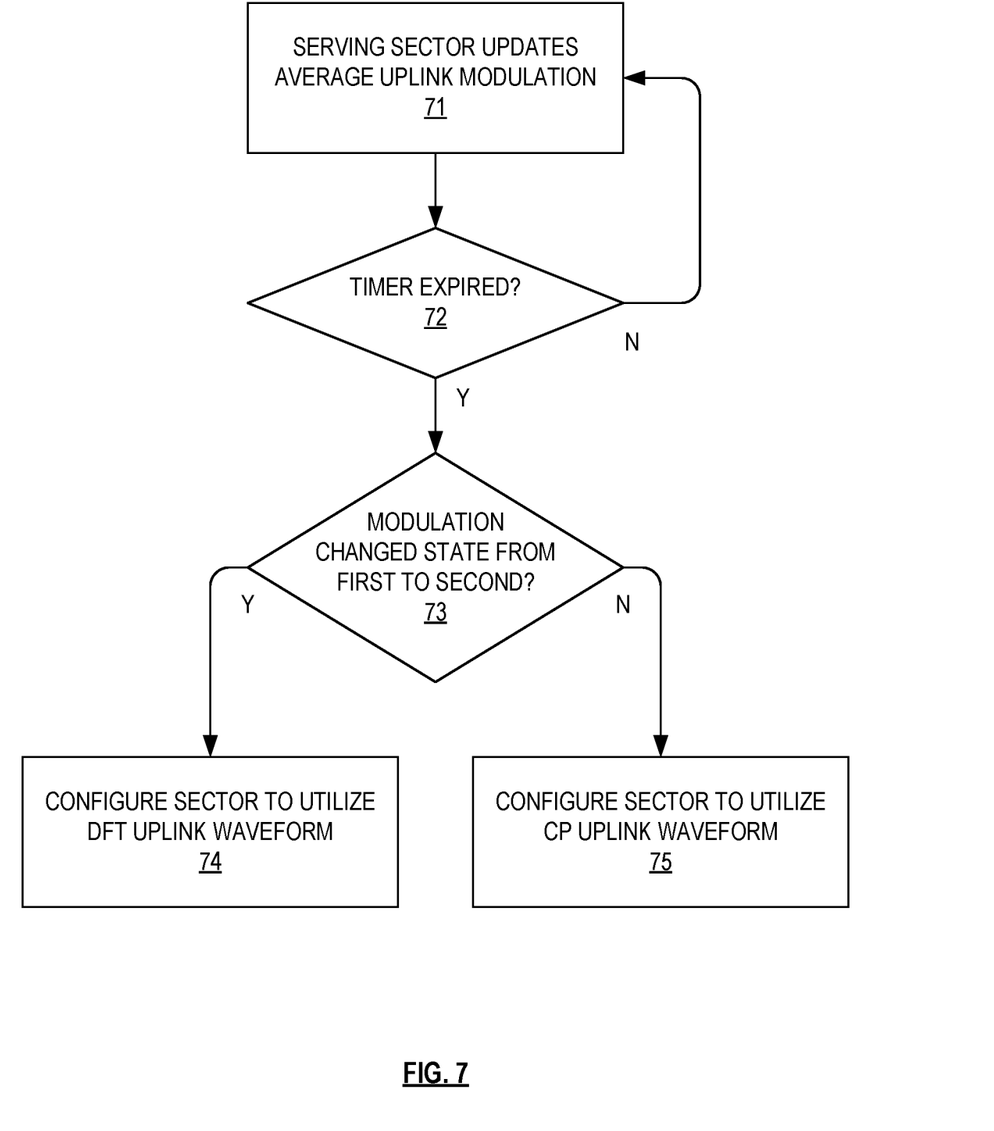
FIG. 7 depicts a first exemplary trigger for selection of uplink waveforms.

FIG. 7 depicts a method utilizing a first exemplary trigger for selection of uplink waveforms. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 71, a serving sector updates a modulation or modulation state associated with an uplink channel. The modulation may be updated from a first type of modulation to a second type of modulation. For example, the types of modulation include quadrature amplitude modulation (QAM), or a form of quadrature phase shift keying (QPSK). In an exemplary embodiment, the modulation used by an uplink channel in a sector is updated from a QAM (e.g. 16QAM, 64QAM, etc.) modulation state to a QPSK modulation state. In an exemplary embodiment, a timer 72 is counted, and if the timer expires, then at 73, the change in modulation state is detected.

If it is detected at 73 that the modulation is updated from a first state (e.g. QAM) to a second state (e.g. QPSK), then at 74 the sector is configured to utilize (or switch to) the DFT-s-OFDM waveform. On the other hand, if the change from these two states is not detected (e.g. if the modulation reverts back from a QPSK state to a QAM state, of it is not updated from the QAM state), then the sector is instructed or configured to remain using the DFT-s-OFDM waveform. Thus, the resource block assignment to cell-edge wireless devices in the sector (and opposite facing sectors) is dynamically selected to ensure that uplink signals therefrom do not interfere with each other.

Figure 8:
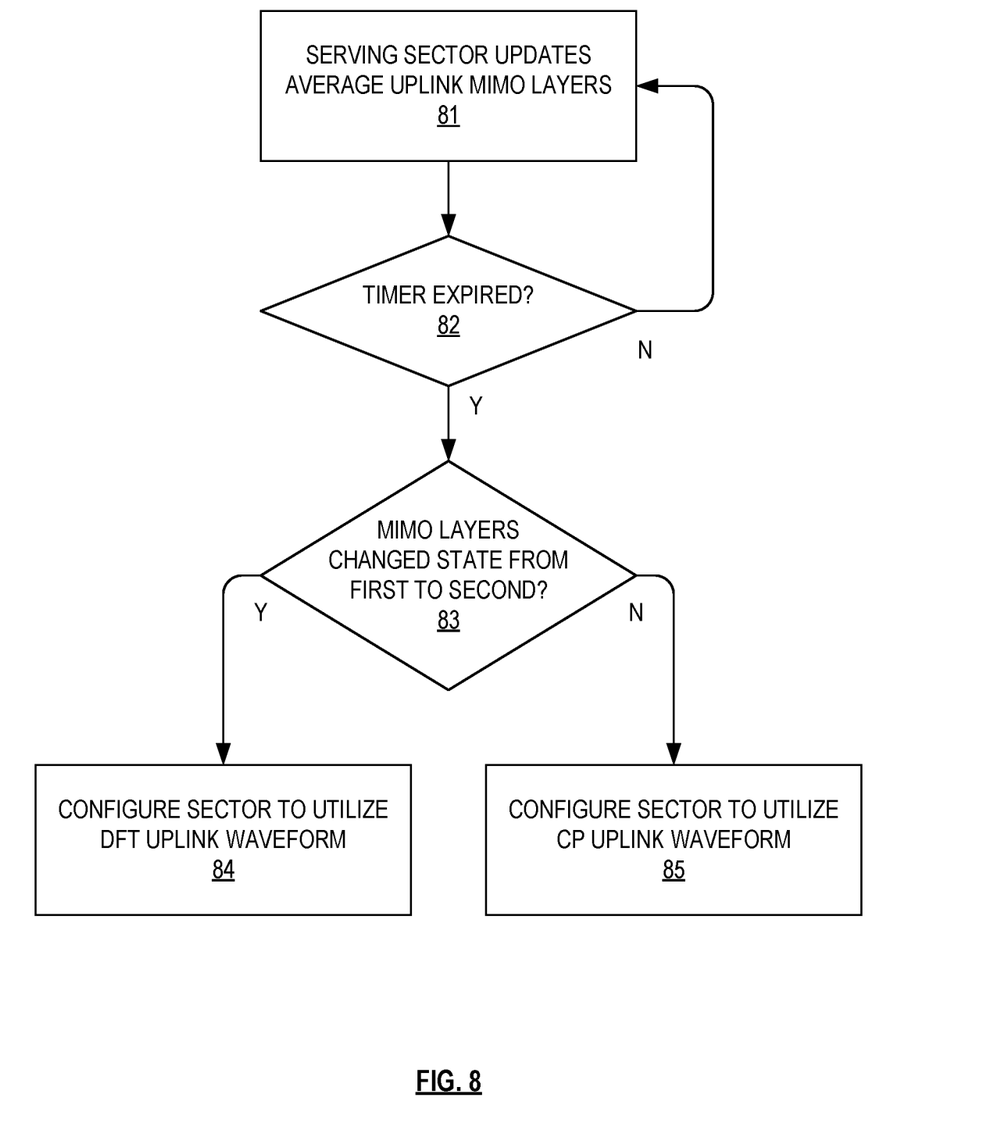
FIG. 8 depicts a second exemplary trigger for selection of uplink waveforms.

FIG. 8 depicts a method using a second exemplary trigger for selection of uplink waveforms. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 81, a serving sector updates an average uplink MIMO layer assignment associated with wireless devices in the sector. The MIMO layer assignment may include two states, a first state wherein a number of MIMO layers is >=2, and a second state wherein a number of MIMO layers is =1. In other words, the number of MIMO layers may be updated from 2 or more to just one layer, and vice versa. Further, a timer 82 is counted, and if the timer expires, then at 83, the change in MIMO layers is detected.

If it is detected at 83 that the quantity of MIMO layers is reduced to one, then at 84 the sector is instructed to switch to (or remain using) the DFT-s-OFDM waveform. On the other hand, if the change from these two states is not detected (e.g. if the MIMO layer assignment reverts back from one to >=2 layers, of the number of layers does not drop below 2, then the sector is instructed to remain using (or instructed to switch to using) the DFT-s-OFDM waveform. Thus, the resource block assignment to cell-edge wireless devices in the sector is dynamically selected to ensure that uplink signals therefrom do not interfere with other opposite-facing sectors that are similarly configured.

In an example embodiment, both modulation and MIMO layer adjustments can be combined. Further, while 5G NR and corresponding flexible CP and DFT waveforms are described in the above embodiments, the disclosed operations may apply to different combinations of radio air interfaces, including any combination of radio air interfaces within the same or different radio-access technologies, including any future wireless technology, as well as any other types of uplink waveforms. So long as the described dynamic and flexible adjustment of uplink waveforms based on predetermined schemes and/or triggered by the different indicators is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting between uplink waveforms, the method comprising:
    configuring a first plurality of wireless sectors deployed within a cell site to utilize different uplink waveforms according to a predetermined scheme;
    configuring a second plurality of wireless sectors deployed within a neighboring cell site to utilize the different uplink waveforms according to the predetermined scheme, such that an overlap is minimized of uplink signals from wireless devices in opposite facing wireless sectors from among the first and second pluralities of wireless sectors, the predetermined scheme comprising rotating between a first uplink waveform of the different uplink waveforms and a second uplink waveform of the different uplink waveforms by setting a starting offset for scheduling the first uplink waveform; and
    determining the starting offset based on a proportion of resource blocks utilizing the first uplink waveform relative to a total amount of resource blocks available in each sector of the first and second pluralities of wireless sectors.

2. The method of claim 1, wherein utilizing different uplink waveforms comprises scheduling the same portions of resource blocks within an uplink time slot of each adjacent sector to utilize different ones of the different uplink waveforms.

3. The method of claim 1, wherein the starting offset is different for each adjacent sector within each of the first and second pluralities of wireless sectors.

4. The method of claim 1, wherein the predetermined scheme is reversed between the first and second pluralities of wireless sectors.

5. The method of claim 1, wherein utilizing different uplink waveforms is performed responsive to one or more of a change in uplink modulation or a change in a multiple-input multiple-output (MIMO) layer assignment.

6. The method of claim 1, wherein the first and second pluralities of wireless sectors are deployed from different access nodes.

7. A system for selecting between uplink waveforms, the system comprising:
    a first access node configured to deploy a first plurality of wireless sectors;
    a second access node neighboring the first access node and configured to deploy a second plurality of wireless sectors; and
    a processing node communicably coupled to both first and second access nodes, the processing node configured to perform operations comprising:
    configuring each of the first plurality of wireless sectors to rotate between a first uplink waveform and a second uplink waveform according to a predetermined scheme; and configuring each of the second plurality of wireless sectors to rotate between the first uplink waveform and the second uplink waveform according to the predetermined scheme, such that an overlap is minimized of uplink signals between adjacent sectors from among the first and second pluralities of wireless sectors; wherein rotating between the first and second uplink waveforms comprises:
    setting a starting offset for scheduling the first uplink waveform, the starting offset being based on a proportion of resource blocks utilizing the first uplink waveform relative to a total amount of resource blocks available in each sector of the first and second wireless sectors.

8. The system of claim 7, wherein rotating between the first and second uplink waveforms comprises scheduling the same portions of resource blocks within an uplink time slot of each adjacent sector of the first and second pluralities of wireless sectors to utilize different ones of the different uplink waveforms.

9. The system of claim 7, wherein the starting offset is different for each adjacent sector within each of the first and second pluralities of wireless sectors.

10. The system of claim 7, wherein the predetermined scheme is reversed between the first and second pluralities of wireless sectors.

11. The system of claim 7, wherein rotating between the first and second uplink waveforms is performed responsive to one or more of a change in uplink modulation or a change in a multiple-input multiple-output (MIMO) layer assignment.

* * * * *